(12) United States Patent
Quick, Jr. et al.

(10) Patent No.: US 7,751,567 B2
(45) Date of Patent: Jul. 6, 2010

(54) LOCAL AUTHENTICATION OF MOBILE SUBSCRIBERS OUTSIDE THEIR HOME SYSTEMS

(75) Inventors: Roy F. Quick, Jr., San Diego, CA (US); Gregory G. Rose, Mortlake (AU)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/142,994

(22) Filed: Jun. 1, 2005

(65) Prior Publication Data
US 2005/0257255 A1 Nov. 17, 2005

Related U.S. Application Data

(63) Continuation of application No. 09/863,139, filed on May 22, 2001, which is a continuation-in-part of application No. 09/755,660, filed on Jan. 5, 2001, now abandoned.

(51) Int. Cl.
| | |
|---|---|
| H04L 9/00 | (2006.01) |
| H04K 1/00 | (2006.01) |
| H04L 9/08 | (2006.01) |
| H04L 9/28 | (2006.01) |
| H04L 29/06 | (2006.01) |
| H04L 9/32 | (2006.01) |
| G06F 21/00 | (2006.01) |
| G06F 7/04 | (2006.01) |
| H04M 11/00 | (2006.01) |
| H04M 1/66 | (2006.01) |
| H04W 4/00 | (2009.01) |

(52) U.S. Cl. ............... 380/264; 380/247; 380/248; 380/270; 380/43; 380/278; 380/44; 380/47; 380/28; 713/150; 713/159; 713/161; 713/168; 713/171; 713/172; 713/176; 713/181; 713/185; 726/9; 455/403; 455/410; 455/411; 455/432.1

(58) Field of Classification Search ............... 380/264, 380/247, 248, 270, 43, 278, 44, 47, 28; 713/150, 713/159, 161, 168, 171, 172, 176, 181, 185; 726/9; 455/403, 410, 411, 432.1
See application file for complete search history.

(56) References Cited

U.S. PATENT DOCUMENTS 4,901,307 A    2/1990   Gilhousen et al.

(Continued)

FOREIGN PATENT DOCUMENTS

EP    1764953    3/2007

(Continued)

OTHER PUBLICATIONS

Schneier, Bruce, Applied Cryptography, 1996, John Wiley & Sons, Inc., Second Edition, pp. 442-445.*

(Continued)

Primary Examiner—Aravind K Moorthy
(74) Attorney, Agent, or Firm—Jae-Hee Choi; Won Tae C. Kim

(57) ABSTRACT

Methods and apparatus are presented for providing local authentication of subscribers traveling outside their home systems. A subscriber identification token 230 provides authentication support by generating a signature 370 based upon a key that is held secret from a mobile unit 220. A mobile unit 220 that is programmed to wrongfully retain keys from a subscriber identification token 230 after a subscriber has removed his or her token is prevented from subsequently accessing the subscriber's account.

18 Claims, 5 Drawing Sheets

U.S. PATENT DOCUMENTS

| | | | |
|---|---|---|---|
| 5,103,459 | A | 4/1992 | Gilhousen et al. |
| 5,153,919 | A * | 10/1992 | Reeds et al. ............... 380/44 |
| 5,204,902 | A * | 4/1993 | Reeds et al. ............. 380/248 |
| 5,371,794 | A * | 12/1994 | Diffie et al. .............. 713/156 |
| 5,412,730 | A * | 5/1995 | Jones ....................... 380/46 |
| 5,491,749 | A * | 2/1996 | Rogaway ................. 713/171 |
| 5,778,072 | A | 7/1998 | Samar |
| 5,943,615 | A * | 8/1999 | Rose et al. ................ 455/411 |
| 6,076,162 | A | 6/2000 | Deindl et al. |
| 6,094,487 | A | 7/2000 | Butler et al. |
| 6,173,173 | B1 | 1/2001 | Dean et al. |
| 6,178,506 | B1 * | 1/2001 | Quick, Jr. ................. 713/168 |
| 6,225,888 | B1 | 5/2001 | Juopperi |
| 6,230,002 | B1 * | 5/2001 | Floden et al. ............. 455/411 |
| 6,260,147 | B1 * | 7/2001 | Quick, Jr. ................. 713/182 |
| 6,490,357 | B1 | 12/2002 | Rose |
| 6,516,414 | B1 | 2/2003 | Zhang et al. |
| 6,560,338 | B1 * | 5/2003 | Rose et al. ................ 380/47 |
| 6,578,143 | B1 * | 6/2003 | Rose ........................ 713/164 |
| 6,606,313 | B1 | 8/2003 | Dahlman et al. |
| 6,609,199 | B1 | 8/2003 | DeTreville |
| 6,707,915 | B1 | 3/2004 | Jobst et al. |
| 6,766,453 | B1 | 7/2004 | Nessett et al. |
| 6,816,458 | B1 * | 11/2004 | Kroon ....................... 370/235 |
| 6,839,434 | B1 * | 1/2005 | Mizikovsky ............... 380/247 |
| 6,876,747 | B1 * | 4/2005 | Faccin et al. .............. 380/247 |
| 6,950,521 | B1 | 9/2005 | Marcovici et al. |
| 2007/0234404 | A1 * | 10/2007 | Bogdanovic et al. ......... 726/3 |
| 2007/0239994 | A1 * | 10/2007 | Kulkarni et al. ........... 713/189 |
| 2008/0037775 | A1 | 2/2008 | Gilman |
| 2008/0052769 | A1 * | 2/2008 | Leone et al. ................ 726/7 |
| 2008/0063190 | A1 | 3/2008 | Campagna et al. |
| 2008/0104403 | A1 | 5/2008 | Gueron |
| 2008/0181408 | A1 | 7/2008 | Hird |
| 2008/0295159 | A1 * | 11/2008 | Sentinelli ..................... 726/6 |
| 2009/0041250 | A1 * | 2/2009 | Park et al. ................. 380/277 |
| 2009/0088068 | A1 * | 4/2009 | Ferrazzini et al. ......... 455/3.06 |
| 2009/0191857 | A1 * | 7/2009 | Horn et al. ................. 455/419 |
| 2009/0220091 | A1 * | 9/2009 | Howard ..................... 380/277 |

FOREIGN PATENT DOCUMENTS

| | | |
|---|---|---|
| JP | 09-036851 | 2/1997 |
| KR | 199870017 | 10/1998 |
| KR | 200035805 | 6/2000 |
| WO | WO 0169838 A2 * | 9/2001 |
| WO | 020054663 | 7/2002 |

OTHER PUBLICATIONS

Bruce Schneier, Applied Cryptography, 1996, John Wiley & Sons, Inc., Second Edition, pp. 442-445.*

3G Ts 33.102 V3.1.0: 3rd Generation Partnership Project; Technical Specification Group Services and System Aspects; 3G Security; Security Architecture (3G Ts 33.102 version 3.1.0). pgs. 1-56 (1999-07).

3GPP TS 25.214 V3.5.0: "3rd Generation Partnersh p Project; Technical Specification Group Radio Access Network; Physical layer procedures (Fdd)(Release 1999)." pp. 1-47 (2000-12).

3GPP2 C.S0001-0 Version 1.0: "Physical Layer Standard for cdma2000 Spread Spectrum Systems." pp. 1-369 (1999-07).

3GPP2 Document No. C.P0002-A, Tia Pn-4694. To be published as TIA/EIA/IS-2000-2-A: "Physical Layer Standard for cdma2000 Spread Spectrum Systems," pp. 1-424, Draft Version, Edit Version 30 (1999-11).

ETSI TS 125 211 V3.5.0: Universal Mobile Telecommunications System (UMTS); Physical channels and mapping of transport channels onto physical channels (FDD)(3GPP TS 25.211 version 3.5.0 Release 1999), pp. 1-47 (2000-12).

ETSI TS 125 212 V3.5.0: Universal Mobile Telecommunications System (UMTS): Multiplexing and channel coding (FDD)(3GPP TS 25.212 version 3.5.0 Release 1999), pp. 1-64 (2000-12).

ETSI TS 125 213 V3.4.0: Universal Mobile Telecommunications System (UMTS): Spreading and modulation (FDD) (3GPP TS 25.213 version 3.4.0 Release 1999), pp. 1-28 (2000-12).

Federal Information Processing Standard (FIPS) Pub 186, Digital Signature Standard (1994-05).

Federal Information Processing Standard (FIPS) Pub 46, Data Encryption Standard (DES) (1977-01).

TIA/EIA/IS-707-A-1: "Data Services Options for Spread Spectrum Systems - Radio Link Protocol Type 3 - Addendum No. 1." pp. 1-146 (1999-12).

TIA/EIA/IS-808: "Incorporating UIM into 3G and IMT-2000 Systems." pp. 1-92 (2000-11).

TIA/EIA-95-B: "Mobile Station-Base Station Compatibility Standard for Wideband Spread Spectrum Cellular Systems (Upgrade and Revision of TIA/EIA-95-A," pp. 1-1206 (1999-03).

Bellare, M., et al.: "Keying Hash Functions for Message Authentication," Advances in Cryptology, Crypto 96 Procedings, Lecture Notes in Computer Science. vol. 1109, pp. 1-19 (1996-06).

Chuanwu. Z. et al.: "Encryption Based on Reversible Cellular Automata," 2002 IEEE, pp. 1223-1226.

Hom, G., et al.: "An Introduction to the Security Features of 3GPP and Third Generation Mobile Communications Systems." pp. 1-39, VTC 2000 Spring Conference (2000).

Kay, a.: "VViFi's Widening World," The Washington Post, Washington, D.C., pp. H.07 (2002-12) .

Levi, a. et al.: "A Multiple Signature Based Certificate Verification Scheme." Bogazici Universiy. Department of Computer Engineering, pp. 1-5.

Lucent Technologies: "Rogues Ms-Shell Threat Analysis (ANSI-41)." 3GPP TSG SA WG3 Security— S3#16, Document No. S3-000711, pp. 1-17 (2000-11).

Mehrotra, A. et al. "Mobility and Security Management in the GSM System and Some Proposed Future Improvements," Proceedings of the IEEE. Vo. 86, No. 7) pp. 1480-1490 (1998-07) .

Rose. et al.: "Method and Apparatus for Generating a Message Authentication Code." U.S. Appl. No. 09/371.147. filed Aug. 09, 1999.

International Search Report, PCT/US2002/016103-International Search Authority-European Patent Office, 09/05/02.

International Preliminary Examination Report, PCT/US2002/016103-International Preliminary Examining Authority-US, Mar. 19, 2003.

* cited by examiner

LOCAL AUTHENTICATION OF MOBILE SUBSCRIBERS OUTSIDE THEIR HOME SYSTEMS

CLAIM OF PRIORITY UNDER 35 U.S.C. §120

The present Application for Patent is a continuation of patent application Ser. No. 09/863,139 entitled "Local Authentication of Mobile Subscribers Outside Their Home Systems" filed May 22, 2001, pending which is a continuation-in-part of patent application Ser. No. 09/755,660 entitled "Local Authentication in a Communication System" filed Jan. 5, 2001, now abandoned, and assigned to the assignee hereof and hereby expressly incorporated by reference herein.

BACKGROUND

I. Field of the Invention

The present invention relates to communication systems, and more particularly, to local authentication of a communication system subscriber.

II. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS-95B, ANSI J-STD-008 (often referred to collectively herein as IS-95), and proposed high-data-rate systems for data, etc. are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA. The cdma2000 proposal is compatible with IS-95 systems in many ways. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

Given the ubiquitous proliferation of telecommunications services in most parts of the world and the increased mobility of the general populace, it is desirable to provide communication services to a subscriber while he or she is travelling outside the range of the subscriber's home system. One method of satisfying this need is the use of an identification token, such as the Subscriber Identity Module (SIM) in GSM systems, wherein a subscriber is assigned a SIM card that can be inserted into a GSM phone. The SIM card carries information that is used to identify the billing information of the party inserting the SIM card into a mobile phone. Next generation SIM cards have been renamed as USIM (UTMS SIM) cards. In a CDMA system, the identification token is referred to as a Removable User Interface Module (R-UIM) and accomplishes the same purpose. Use of such an identification token allows a subscriber to travel without his or her personal mobile phone, which may be configured to operated on frequencies that are not used in the visited environment, and to use a locally available mobile phone without incurring costs in establishing a new account.

Although convenient, the use of such identification tokens to access account information of a subscriber can be insecure. Currently, such identification tokens are programmed to transmit private information, such as a cryptographic key used for message encryption or an authentication key for identifying the subscriber, to the mobile phone. A person contemplating the theft of account information can accomplish his or her goal by programming a mobile phone to retain private information after the identification token has been removed, or to transmit the private information to another storage unit during the legitimate use of the mobile phone. Mobile phones that have been tampered in this manner will hereafter be referred to as "rogue shells." Hence, there is a current need to preserve the security of the private information stored on an identification token while still facilitating the use of said private information to access communication services.

SUMMARY

A novel method and apparatus for providing secure authentication to a subscriber roaming outside his or her home system are presented. In one aspect, a subscriber identification token is configured to provide authentication support to a mobile unit, wherein the mobile unit conveys information to the subscriber identification token for transformation via a secret key.

In one aspect, an apparatus for authenticating a subscriber in a wireless communication system is presented, wherein the apparatus can be communicatively coupled to a mobile station operating within the wireless communications system. The apparatus comprises a memory and a processor configured to implement a set of instructions stored in the memory, the set of instructions for selectively generating a primary signature based upon a key that is held private from the mobile station and a secondary signature that is received from the mobile station.

In another aspect, a method for providing authentication of a subscriber using a subscriber identification device is presented. The method comprises the steps of: generating a plurality of keys; transmitting at least one key from the plurality of keys to a communications device communicatively coupled to the subscriber identification device and holding private at least one key from the plurality of keys; generating a signature at the communications device using both the at least one key transmitted to the communications device and a transmission message, wherein generating is implemented by hashing a concatenated value formed from the at least one key and the transmission message; transmitting the signature to the subscriber identification device; receiving the signature at the subscriber identification device; generating a primary signature from the received signature, wherein the generating is implemented by hashing a concatenated value formed from the at least one private key and the signature received from the communications device; and conveying the primary signature to a communications system.

In another aspect, a subscriber identification module is presented. The subscriber identification module comprises a key generation element and a signature generator configured to receive a secret key from the key generation element and information from a mobile unit, and further configured to generate a signature that will be sent to the mobile unit, wherein the signature is generated by concatenating the secret key with the information from the mobile unit and hashing the concatenated secret key and information.

DETAILED DESCRIPTION OF THE DRAWINGS

DETAILED DESCRIPTION OF THE EMBODIMENTS

Figure 1:
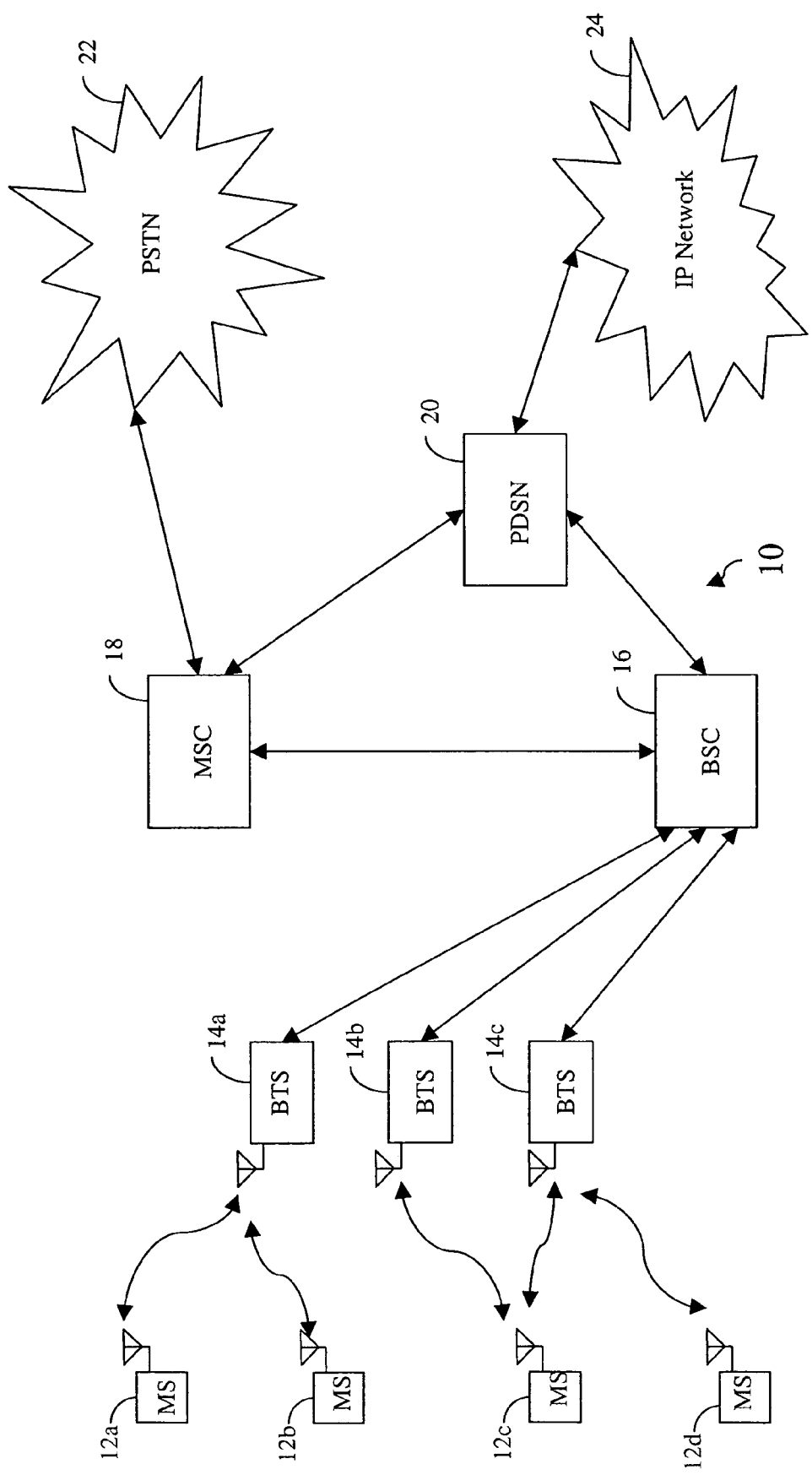
FIG. 1 is a diagram of an exemplary data communication system.

As illustrated in FIG. 1, a wireless communication network 10 generally includes a plurality of mobile stations (also called subscriber units or user equipment) 12a-12d, a plurality of base stations (also called base station transceivers (BTSs) or Node B) 14a-14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a-12d, three base stations 14a-14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a-12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a-12d may be configured to perform one or more wireless packet data protocols such as, for example, the EIA/TIA/IS-707 standard. In a particular embodiment, the mobile stations 12a-12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC 18 is coupled to the BSC 16 and the PSTN 22, and the BSC 16 is coupled to the base stations 14a-14c via wirelines configured for transmission of voice and/or data packets in accordance with any of several known protocols including, e.g., E1, T1, Asynchronous Transfer Mode (ATM), IP, Frame Relay, HDSL, ADSL, or xDSL. In an alternate embodiment, the BSC 16 is coupled directly to the PDSN 20, and the MSC 18 is not coupled to the PDSN 20. In another embodiment of the invention, the mobile stations 12a-12d communicate with the base stations 14a-14c over an RF interface defined in the $3^{rd}$ Generation Partnership Project 2 "3GPP2", "Physical Layer Standard for cdma2000 Spread Spectrum Systems," 3GPP2 Document No. C.P0002-A, TIA PN-4694, to be published as TIA/EIA/IS-2000-2-A, (Draft, edit version 30) (Nov. 19, 1999), which is fully incorporated herein by reference.

During typical operation of the wireless communication network 10, the base stations 14a-14c receive and demodulate sets of reverse-link signals from various mobile stations 12a-12d engaged in telephone calls, Web browsing, or other data communications. Each reverse-link signal received by a given base station 14a-14c is processed within that base station 14a-14c. Each base station 14a-14c may communicate with a plurality of mobile stations 12a-12d by modulating and transmitting sets of forward-link signals to the mobile stations 12a-12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a-12d from one base station 14a-14c to another base station 14a-14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

Figure 2:
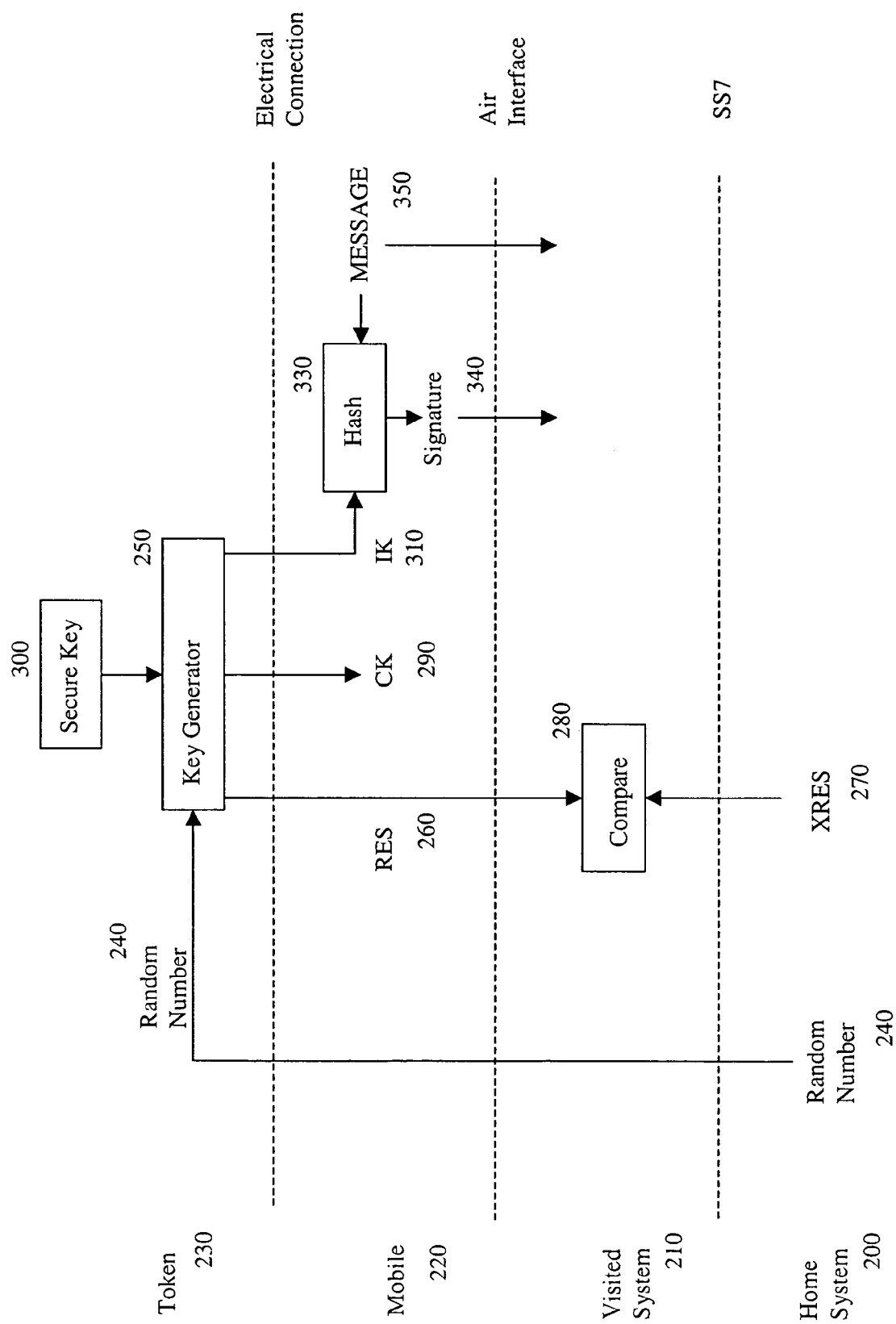
FIG. 2 is a diagram of a communication exchange between components in a wireless communication system.

FIG. 2 illustrates a method for authenticating a subscriber using a mobile phone in a wireless communication system. A subscriber traveling outside of the range of his or her Home System (HS) 200 uses a mobile unit 220 in a Visited System (VS) 210. The subscriber uses the mobile unit 220 by inserting a subscriber identification token. Such a subscriber identification token is configured to generate cryptographic and authentication information that allows a subscriber to access account services without the need for establishing a new account with the visited system. A request (note shown in figure) is sent from the mobile unit 220 to the VS 210 for service. VS 210 contacts HS 200 to determine service to the subscriber (not shown in figure).

HS 200 generates a random number 240 and an expected response (XRES) 270 based on knowledge of the private information held on the subscriber identification token. The random number 240 is to be used as a challenge, wherein the targeted recipient uses the random number 240 and private knowledge to generate a confirmation response that matches the expected response 270. The random number 240 and the XRES 270 are transmitted from the HS 200 to the VS 210. Other information is also transmitted, but is not relevant herein (not shown in figure). Communication between the HS 200 and the VS 210 is facilitated in the manner described in FIG. 1. The VS 210 transmits the random number 240 to the mobile unit 220 and awaits the transmission of a confirmation message 260 from the mobile unit 220. The confirmation message 260 and the XRES 270 are compared at a compare element 280 at the VS 210. If the confirmation message 260 and XRES 270 match, the VS 210 proceeds to provide service to the mobile unit 220.

Mobile unit 220 sends the random number 240 to the subscriber identification token 230 that has been inserted inside the mobile unit 220 by the subscriber. A Secure Key 300 is stored on the subscriber identification token 230. Both the Secure Key 300 and the random number 240 are used by a key generator 250 to generate the confirmation message 260, a cryptographic Cipher Key (CK) 290, and an Integrity Key (IK) 310. The CK 290 and IK 310 are conveyed to the mobile unit 220.

At the mobile unit 220, the CK 290 can be used to encrypt communications between the mobile unit 220 and the VS 210, so that communications can be decrypted only by the intended recipient of the message. Techniques for using a cryptographic key to encrypt communications are described in co-pending U.S. patent application Ser. No. 09/143,441, filed on Aug. 28, 1998, entitled, "Method and Apparatus for Generating Encryption Stream Ciphers," assigned to the assignee of the present invention, and incorporated by reference herein. Other encryption techniques can be used without affecting the scope of the embodiments described herein.

The IK 310 can be used to generate a message authentication code (MAC), wherein the MAC is appended to a transmission message frame in order to verify that the transmission message frame originated from a particular party and to verify that the message was not altered during transmission. Techniques for generating MACs are described in co-pending U.S. patent application Ser. No. 09/371,147, filed on Aug. 9, 1999, entitled, "Method and Apparatus for Generating a Message Authentication Code," assigned to the assignee of the present invention and incorporated by reference herein. Other techniques for generating authentication codes may be used without affecting the scope of the embodiments described herein. Hence, the term "signature" as used herein represents the output of any authentication scheme that can be implemented in a communication system.

Alternatively, the IK 310 can be used to generate an authentication signature 340 based on particular information that is transmitted separately or together with the transmission message. Techniques for generating an authentication signature are described in U.S. Pat. No. 5,943,615, entitled, "Method and Apparatus for Providing Authentication Security in a Wireless Communication System," assigned to the assignee of the present invention and incorporated by reference herein. The authentication signature 340 is the output of a hashing element 330 that combines the IK 310 with a message 350 from the mobile unit 220. The authentication signature 340 and the message 350 are transmitted over the air to the VS 210.

As seen in FIG. 2, the cryptographic key 290 and the integrity key 310 are transmitted from the subscriber identification token 230 to the mobile unit 220, which proceeds to generate data frames for public dissemination over the air. While this technique may prevent an eavesdropper from determining the values of such keys over the air, this technique does not provide protection from attack by a rogue shell. A rogue shell can be programmed to accept the CK 290 and the IK 310, and to then store the keys rather than purging the presence of such keys from local memory. Another method to steal keys is to program the mobile unit 220 to transmit received keys to another location. The CK 290 and the IK 310 can then be used to fraudulently bill unauthorized communications to the subscriber. This rogue shell attack is particularly effective in systems wherein the random number generated at the Home System 200 is used in a manner that is insecure, such as the case when the same generated keys are used for an extended period of time.

An embodiment that protects against a rogue shell attack uses the processors and memory in the subscriber identification token to generate an electronic signature that cannot be reproduced by a mobile unit without the insertion of the subscriber identification token.

Figure 3:
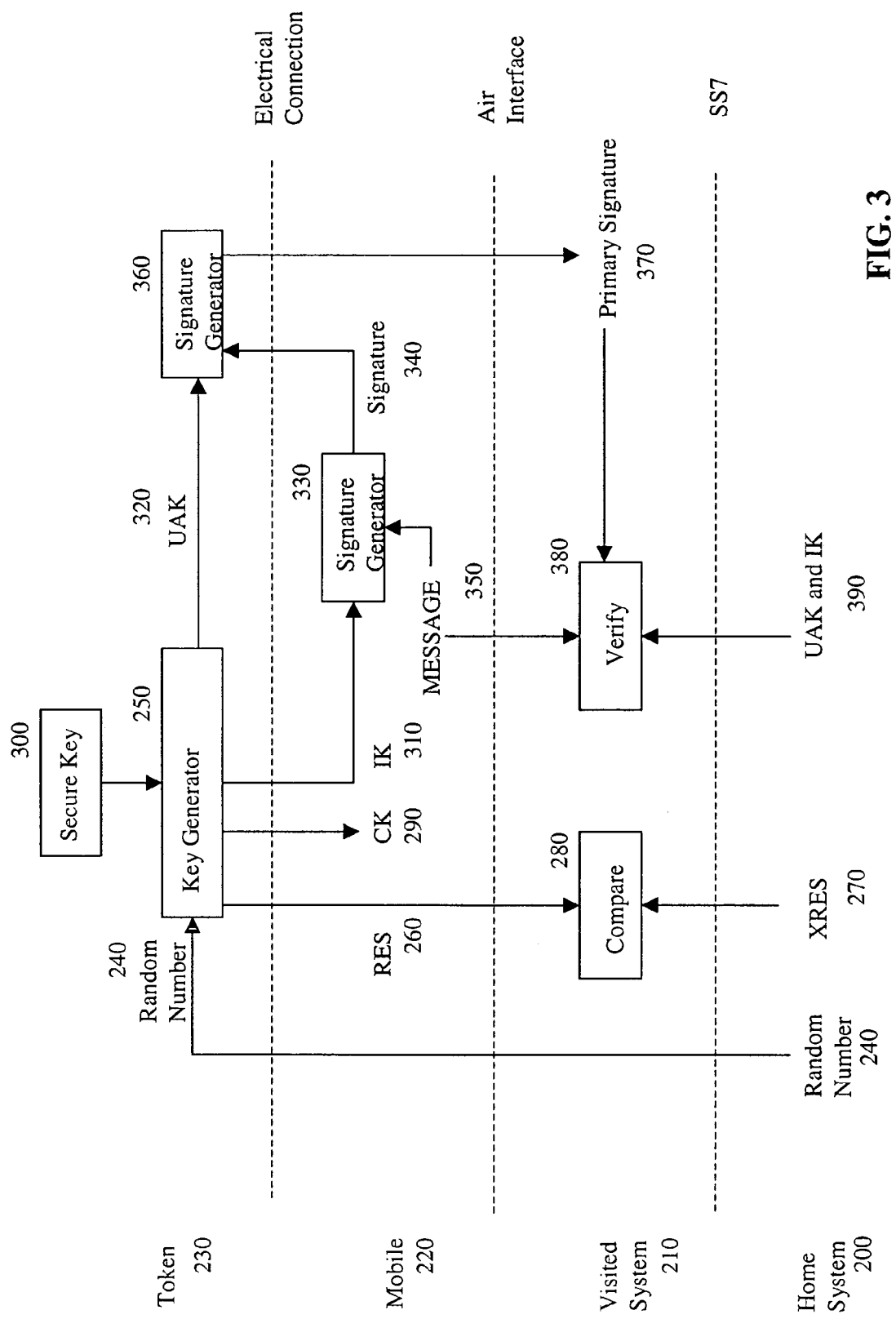
FIG. 3 is a diagram of an embodiment wherein a subscriber identification token provides encryption support to a mobile unit.

FIG. 3 illustrates an embodiment for performing local authentication of a subscriber in a wireless communication system. In this embodiment, the subscriber identification token 230 is programmed to generate an authentication response based on a key that is not passed to the mobile unit 220. Hence, if the mobile unit used by a subscriber is a rogue shell, the rogue shell cannot recreate the appropriate authentication responses.

Similar to the method described in FIG. 2, the mobile unit 220 generates a signature signal based upon an IK 310 that is received from the subscriber identification token 230 and a message that is to be sent to the VS 210. However, in one embodiment, the signature signal is not passed to the VS. The signature signal is passed to the subscriber identification token 230, and is used along with an additional key to generate a primary signature signal. The primary signature signal is sent out to the mobile unit 220, which in turn transmits the primary signature signal to the VS 210 for authentication purposes.

HS 200 generates a random number 240 and an expected response (XRES) 270 based on knowledge of the Secure Key held on the subscriber identification token 230. The random number 240 and the XRES 270 are transmitted to the VS 210. Communication between the HS 200 and the VS 210 is facilitated in the manner described in FIG. 1. The VS 210 transmits the random number 240 to the mobile unit 220 and awaits the transmission of a confirmation message 260 from the mobile unit 220. The confirmation message 260 and the XRES 270 are compared at a compare element 280 at the VS 210. If the confirmation message 260 and the XRES 270 match, the VS 210 proceeds to provide service to the mobile unit 220.

Mobile unit 220 conveys the random number 240 to the subscriber identification token 230 that has been electronically coupled with the mobile unit 220 by the subscriber. A Secure Key 300 is stored on the subscriber identification token 230. Both the Secure Key 300 and the random number 240 are used by a key generator 250 to generate the confirmation message 260, a Cryptographic Key (CK) 290, an Integrity Key (IK) 310, and a UIM Authentication Key (UAK) 320. The CK 290 and IK 310 are conveyed to the mobile unit 220.

At the mobile unit 220, the CK 290 is used for encrypting transmission data frames (not shown in FIG. 3). The IK 310 is used to generate a signature signal 340. The signature signal 340 is the output of a signature generator 330 that uses an encryption operation or a one-way operation, such as a hashing function, upon the IK 310 and a message 350 from the mobile unit 220. The signature signal 340 is transmitted to the subscriber identification token 230. At the subscriber identification token 230, the signature signal 340 and the UAK 320 are manipulated by a signature generator 360 to generate a primary signature signal 370. The primary signature signal 370 is transmitted to the mobile unit 220 and to the VS 210, where a verification element 380 authenticates the identity of the subscriber. The verification element 380 can accomplish the verification by regenerating the signature signal 340 and the primary signature signal 370. Alternatively, the verification element 380 can receive the signature signal 340 from the mobile unit 220 and only regenerate the primary signature signal 370.

The regeneration of the signature signal 340 and the primary signature signal 370 at the VS 210 can be accomplished by a variety of techniques. In one embodiment, the verification element 380 can receive a UAK 390 and an integrity key from the Home System 200. When the verification element 380 also receives the message 350 from the mobile unit 220, the signature signal can be generated and then be used to generate the primary signature element.

The signature generator 360 within the subscriber identification token 230 can comprise a memory and a processor, wherein the processor can be configured to manipulate inputs using a variety of techniques. These techniques can take the form of encryption techniques, hashing functions, or any nonreversible operation. As an example, one technique that can be implemented by the subscriber identification token is the Secure Hash Algorithm (SHA), promulgated in Federal Information Processing Standard (FIPS) PUB 186, "Digital Signature Standard," May 1994. Another technique that can be performed by the subscriber identification token is the Data Encryption Standard (DES), promulgated in FIPS PUB 46, January 1977. The use of the term "encryption" as used herein does not necessarily imply that operations must be reversible. The operations may be non-reversible in the embodiments described herein.

The key generator 250 can also comprise a memory and a processor. Indeed, in one embodiment, a single processor can be configured to accomplish the functions of the signature generator 360 and the key generator 250. Verification can be performed by calculating the same result from the same inputs at the verification element 380, and comparing the calculated and transmitted values.

Figure 4:
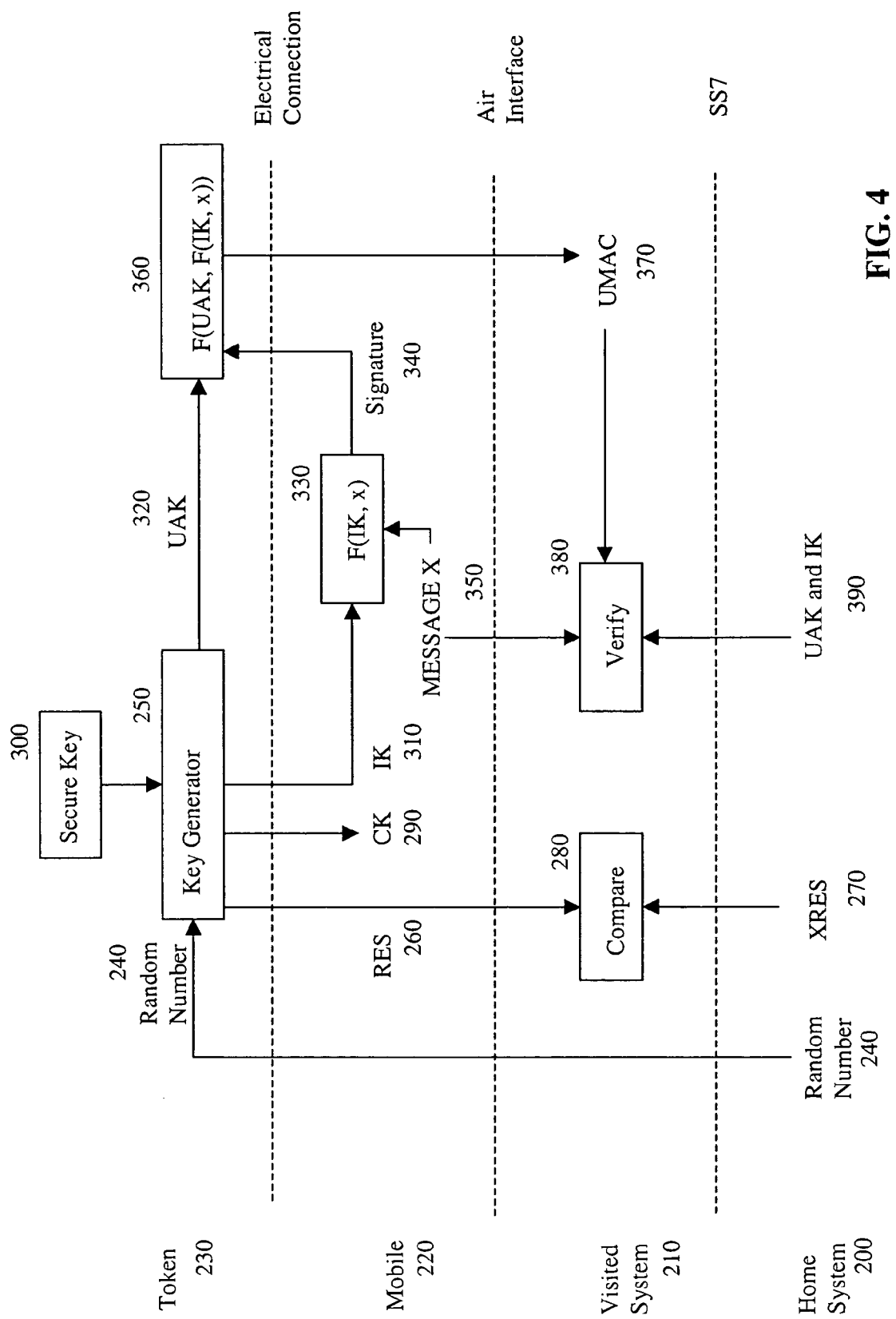
FIG. 4 is a diagram of an embodiment wherein a hashing function is used to generate an authentication signature.

In a more detailed description of the embodiment above, signal generator 330 can be configured to implement a technique referred to herein as HMAC-SHA-1. In the embodiment described above, it was noted that a hashing function could be used within the signal generator 330 to generate a signature signal 340. A description of hash-based MACs (HMACs) can be found in the paper, "Keying Hash Functions for Message Authentication," Bellare, et al., Advances in Cryptology—Crypto 96 Proceedings, Lecture Notes in Computer Science Vol. 1109, Springer-Verlag, 1996. An HMAC is a MAC scheme that uses a cryptographic hash function, such as SHA-1, in a two-step process. In an HMAC-SHA-1 scheme, a random and secret key initializes the SHA-1 function, which is then used to produce a digest of the message. The key is then used to initialize SHA-1 again to produce a digest of the first digest. This second digest provides a MAC that will be appended to each message. In the embodiment described herein, the integrity key (IK) 310 that is generated by the subscriber identification token 230 can be used as the random and secret key initializing SHA-1. FIG. 4 is a flow chart illustrating the implementation of the HMAC in the mobile station, which is initialized by an integrity key from the subscriber identification token, and the implementation of the HMAC in the subscriber identification token, which is initialized by a UIM Authentication Key.

In FIG. 4, HS 200 generates a random number 240 and an expected response (XRES) 270 based on knowledge of the private information held on the subscriber identification token 230. The random number 240 and the XRES 270 are transmitted to the VS 210. Communication between the HS 200 and the VS 210 is facilitated in the manner described in FIG. 1. The VS 210 transmits the random number 240 to the mobile unit 220 and awaits the transmission of a confirmation message 260 from the mobile unit 220. The confirmation message 260 and the XRES 270 are compared at a compare element 280 at the VS 210. If the confirmation message 260 and the XRES 270 match, the VS 210 proceeds to provide service to the mobile unit 220.

Mobile unit 220 conveys the random number 240 to the subscriber identification token 230 that has been electronically coupled with the mobile unit 220 by the subscriber. A Secure Key 300 is stored on the subscriber identification token 230. Both the Secure Key 300 and the random number 240 are used by a key generator 250 to generate the confirmation message 260, a Cryptographic Key (CK) 290, an Integrity Key (IK) 310, and a UIM Authentication Key (UAK) 320. The CK 290 and IK 310 are conveyed to the mobile unit 220.

At the mobile unit 220, the CK 290 is used for encrypting transmission data frames (not shown in FIG. 4). The IK 310 is used to generate a signature signal 340 from the signature generator 330. The signature generator 330 is configured to produce a transformation of the message 260 through the use of SHA-1. The SHA-1 hashing function is initialized by the IK 310.

The signature signal 340, which is the result of the SHA-1 hashing function transforming the message 260, is transmitted to the subscriber identification token 230. At the subscriber identification token 230, the signature signal 340 and the UAK 320 are manipulated by a signature generator 360 to generate a transformation of the of the signature signal 340, which is the UIM message authentication code (UMAC) 370. The signature generator 360 is also configured to implement the SHA-1 hashing function, However, the function is initialized using UAK 320, rather then IK 310.

The UMAC 370 is transmitted to the mobile unit 220 and to the VS 210, where a verification element 380 authenticates the identity of the subscriber. The verification element 380 can accomplish the verification by regenerating the signature signal 340 and the UMAC 370. Alternatively, the verification element 380 can receive the signature signal 340 from the mobile unit 220 and only regenerate the UMAC 370.

Figure 5:
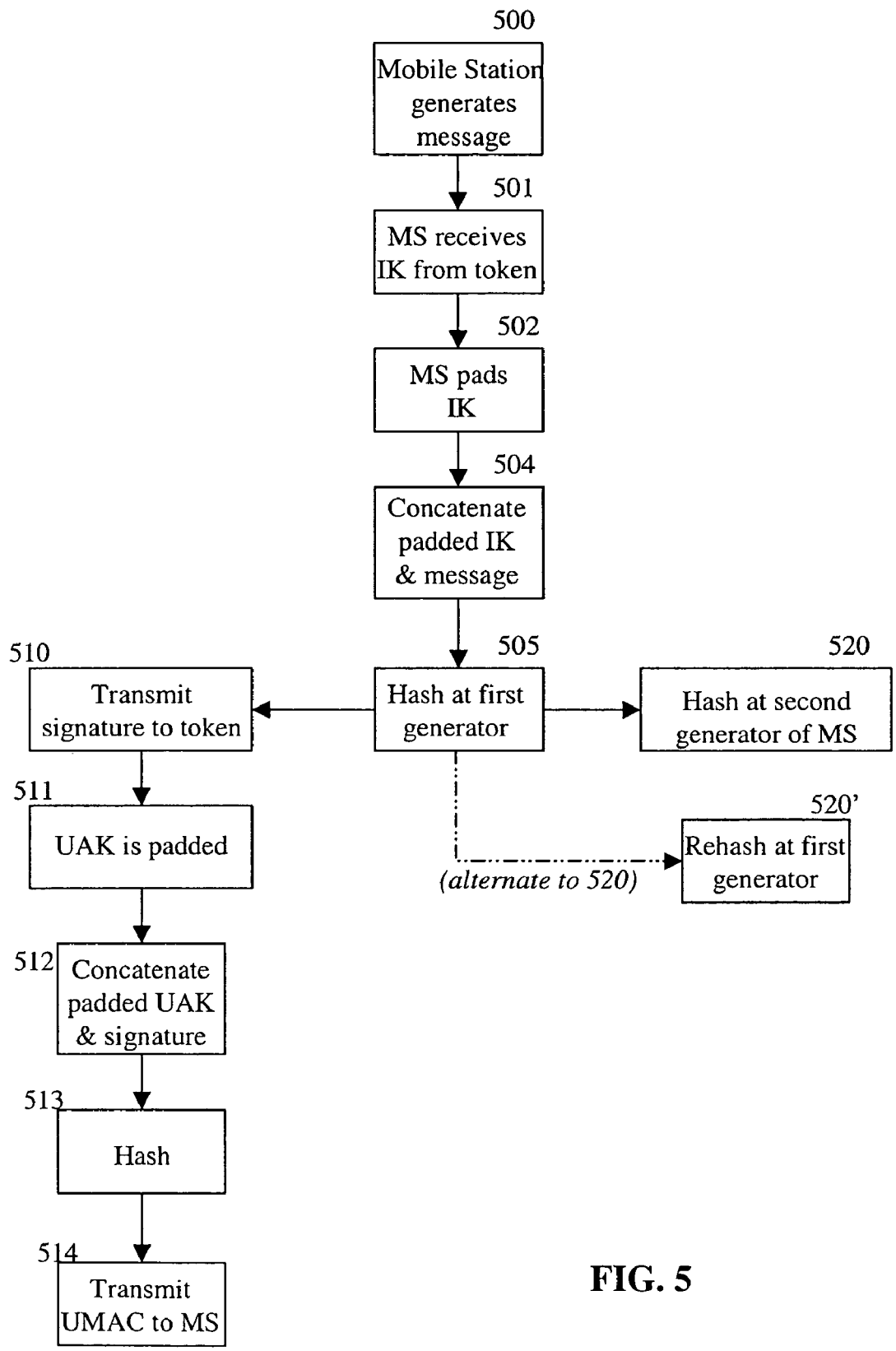
FIG. 5 is a flow chart of a method to hash a message in order to generate an authentication signature.

FIG. 5 is a flow chart illustrating a generalized description of the embodiment. At step 500, a mobile unit generates a message that requires authentication. At step 501, the mobile unit receives an integrity key (IK) of length L from a subscriber identification token. At step 502, the mobile unit pads the integrity key IK to length b, wherein b is the block size of the hashing function of a signature generator within the mobile unit. In one embodiment, the key can be zero-padded to length b. In another embodiment, the key can be XORed with padding constants of length b. If the IK already has length b, then this step can be omitted. At step 504, the padded IK is concatenated with the message that requires authentication. The concatenation of the padded IK and the message is then hashed at step 505 by a signature generator configured to implement a hashing function such as SHA. In one embodiment, the output of the XOR operation is saved within a memory element, and can be recalled for further use if the IK from the subscriber identification token remains the same during the communication session.

If the UIM authentication key (UAK) is to be used, then the program flow proceeds to step 510. If the UAK is not to be used, then the program flow proceeds to step 520.

At step 510, the hashed message from step 505 is transmitted to the subscriber identification token. At step 511, the subscriber identification token pads the UAK to length b, unless the UAK is already of length b. The padded IK can be stored in memory for reuse when a subsequent message requires authentication during the communication session. At step 512, the padded IK and the hashed message are concatenated and inputted into a signature generator. The signature generator is configured to implement a hashing function, such as SHA-1 at step 513. At step 514, the output of the signature generator is transmitted from the subscriber identification token to the mobile unit.

At step 520, the same integrity key is used to rehash the already hashed message. The hashed message from step 505 is sent to a second signature generator within the mobile unit. Or alternatively, the hashed message can be re-inserted into the signature generator of step 505. If one integrity key is to be used in two hashing processes, then the integrity key must be altered so that each of hashing generators is initialized with a different value. For example, for each hashing step, the integrity key can be bit-wise added to either constant value $c_1$ or constant value $c_2$, both of length b. Using this method, only one integrity key needs to be generated by the subscriber identification token.

It should be noted that the more secure embodiment is the implementation wherein the second hashing step is performed using the UAK at the subscriber identification token.

The process described in FIG. 5 can be mathematically described by the equation:

$$HMAC(x) = F_{token}(UAK, F_{mobile}(IK, x)),$$

wherein $F_Y(\ )$ represents a hashing function performed at a location Y, x represents the original message, UAK and IK are the keys, and a comma represents a concatenation.

A subscriber identification token used in a CDMA system or a GSM system, also known as an R-UIM or a USIM, respectively, can be configured to generate the primary signature signal or UMAC in the manner described above, i.e., all messages generated by the mobile unit are encrypted and authenticated. However, since the central processing unit in such tokens can be limited, it may be desirable to implement an alternative embodiment, wherein a weight of importance is assigned to a message frame so that only important messages are securely encrypted and authenticated. For example, a message frame containing billing information has more need for increased security than a message frame containing a voice payload. Hence, the mobile unit can assign a greater weight of importance to the billing information message frame and a lesser weight of importance to the voice message frame. When the subscriber identification token receives the signature signals generated from these weighted messages, the CPU can assess the different weights of importance attached to each signature signal and determine a primary signature signal for only the heavily weighted signature signals. Alternatively, the mobile unit can be programmed to convey only the "important" signature signals to the subscriber identification token. This method of selective primary signature signal generation increases the efficiency of the subscriber identification token by lightening the processing load of the subscriber identification token.

The embodiments described above prevent unauthorized use of a subscriber's account by requiring a more secure transaction between the subscriber identification token and the mobile unit. Since the mobile unit cannot generate a primary signature signal without knowledge of the secret UAK, the mobile unit that is programmed to act as a rogue shell cannot misappropriate subscriber information for wrongful purposes.

The embodiments described above also maximize the processing capability of the subscriber identification token by operating on a signature signal, rather than a message. Typically, a signature signal will have a shorter bit length than a message. Hence, less time is required for the signature generator in the subscriber identification to operate on a signature signal rather than a transmission message frame. As mentioned above, the processing capability of the subscriber identification token is usually much less than the processing capability of the mobile unit. Hence the implementation of this embodiment would provide secure authentication of messages without sacrificing speed.

However, it should be noted that improvements in processor architectures occur at an almost exponential pace. Such improvements consist of faster processing times and smaller processor sizes. Hence, another embodiment for providing local authentication can be implemented wherein the primary signature signal can be generated directly from a message, rather than indirectly through a short signature signal. A mobile unit can be configured to pass a message directly to the subscriber identification token, one with the capability to generate a primary signature signal quickly, rather than passing the message to a signature generating element within the mobile unit. In another embodiment, only a limited number of messages need be passed directly to the subscriber identification token, in accordance with the degree of security needed for said messages.

It should be noted that while the various embodiments have been described in the context of a wireless communication system, the various embodiments can be further used to provide secure local authentication of any party using an unfamiliar terminal connected in a communications network.

Thus, novel and improved methods and apparatus for performing local authentication of a subscriber in a communication system have been described. Those of skill in the art would understand that the various illustrative logical blocks, modules, circuits, and algorithm steps described in connection with the embodiments disclosed herein may be implemented as electronic hardware, software, firmware, or combinations thereof. The various illustrative components, blocks, modules, circuits, and steps have been described generally in terms of their functionality. Whether the functionality is implemented as hardware, software, or firmware depends upon the particular application and design constraints imposed on the overall system. Skilled artisans recognize the interchangeability of hardware, software, and firmware under these circumstances, and how best to implement the described functionality for each particular application.

Implementation of various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components. A processor executing a set of firmware instructions, any conventional programmable software module and a processor, or any combination thereof can be designed to perform the functions described herein. The processor may advantageously be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. An exemplary processor is coupled to the storage medium so as to read information from, and write information to, the storage medium. In the alternative, the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc. Those of skill would further appreciate that the data, instructions, commands, information, signals, bits, symbols, and chips that may be referenced throughout the above description are represented by voltages, currents, electromagnetic waves, magnetic fields or particles, optical fields or particles, or any combination thereof.

Various embodiments of the present invention have thus been shown and described. It would be apparent to one of ordinary skill in the art, however, that numerous alterations may be made to the embodiments herein disclosed without departing from the spirit or scope of the invention.

What is claimed is:

1. A subscriber identification token for providing local authentication of a subscriber in a visited communication system, comprising:
    a memory; and
    a processor configured to implement a set of instructions stored in the memory, the set of instructions for:
    generating a plurality of keys in response to a received challenge, where at least one key from the plurality of keys is an integrity key that is provided to a communication unit communicatively coupled to the subscriber identification token and at least one key from the plurality of keys is an authentication key that is kept private from the communication unit;
    generating an authentication signal based on a received signal and the authentication key from the plurality of keys, wherein the received signal is transmitted from the communications unit communicatively coupled to the subscriber identification token, and the received signal is generated by the communications unit using the integrity key from the plurality of keys; and
    transmitting the authentication signal to the visited communication system via the communications unit, the authentication signal for authenticating the identity of the subscriber within the visited communication system.

2. The token of 1, wherein the authentication signal is generated by a hash function.

3. The token of 2, wherein the hash function is the Secure Hash Algorithm (SHA-1).

4. The token of claim 1, the processor the configured to implement additional instructions stored in the memory, the additional instructions for:
    assigning a weight to a transmission message at the mobile unit in accordance with a relative importance of the transmission message; and
    wherein the authentication signal is generated and transmitted only if the assigned weight to the transmission message indicates that the transmission message is important,
    otherwise, if the message is unimportant, the transmission message is transmitted without the authentication signal.

5. A subscriber identification token for use by a subscriber in a mobile unit, the token comprising:
    a key generation element for generating a plurality of keys, where at least one key from the plurality of keys is an integrity key that is provided to the mobile unit communicatively coupled to the subscriber identification token and at least one key from the plurality of keys is an authentication key that is kept private from the communication unit; and
    a signature generator configured to receive the authentication key from the key generation element and a first signature from the mobile unit, where the first signature is based on the integrity key, the signature generator further configured to output a second signature to the mobile unit, wherein the second signature is generated based on the authentication key and the first signature and the second signature is for authenticating the identity of the subscriber.

6. The token of claim 5, comprising:
    a memory; and
    a processor configured to execute a set of instructions stored in the memory, wherein the set of instructions performs a cryptographic transformation upon an input value to produce a plurality of temporary keys.

7. The token of claim 6, wherein the cryptographic transformation is performed using a permanent key.

8. The token of claim 5, comprising:
    a memory; and
    a processor configured to execute a set of instructions stored in the memory, wherein the set of instructions performs a cryptographic transformation upon the information from the mobile unit by using the authentication key, wherein the signature results from the cryptographic transformation.

9. The subscriber identification token of claim 5, wherein a weight is assigned to a transmission message at the mobile unit in accordance with a relative importance of the transmission message, and the second signature is generated and transmitted only if the assigned weight of the transmission message indicates that the transmission message is important, otherwise, if the message is unimportant, the transmission message is transmitted without the second signature.

10. A method for providing authentication of a subscriber using a subscriber identification token within a mobile unit, comprising:
    generating a plurality of keys at the subscriber identification token, where the plurality of keys includes a first key and a second key;
    transmitting the first key from the plurality of keys to the mobile unit communicatively coupled to the subscriber identification token and keeping the second key private from the mobile unit;
    generating a signature at the mobile unit using both the first key transmitted to the mobile unit and a transmission message;
    transmitting the signature to the subscriber identification token;
    receiving the signature at the subscriber identification token;
    generating a primary signature from the received signature and the second key at the subscriber identification token; and
    conveying the primary signature to a visited communication system, for authenticating the identity of the subscriber within the visited communication system.

11. The method of claim 10, wherein the generating of the signature signal is performed using a nonreversible operation.

12. The method of claim 10, wherein the generating of the signature signal is performed using DES.

13. The method of claim 10, wherein the generating of the signature signal is performed using a hash function.

14. The method of claim 13, wherein the hash function is SHA-1.

15. The method of claim 10, further comprising:
  assigning a weight to the transmission message at the mobile unit in accordance with a relative importance of the transmission message; and
  wherein transmitting the signature comprises:
    transmitting the signature to a communications system if the assigned weight to the transmission message indicates that the transmission message is unimportant; and
    transmitting the signature to the subscriber identification token if the assigned weight to the transmission message indicates that the transmission message is important.

16. A processor for use in a subscriber identification token for providing local authentication of a subscriber in a visited communication system, the processor configured to control:
  generating a plurality of keys in response to a received challenge, where at least one key from the plurality of keys is an integrity key that is provided to a communications unit communicatively coupled to the subscriber identification token and at least one key from the plurality of keys is an authentication key that is kept private from the communications unit;
  generating an authentication signal based on a received signal and the authentication key from the plurality of keys, wherein the received signal is transmitted from the communications unit communicatively coupled to the subscriber identification token, and the received signal is generated by the communications unit using the integrity key from the plurality of keys, and
  transmitting the authentication signal to the visited communication system via the communications unit, the authentication signal for authenticating the identity of the subscriber within the visited communication system.

17. A subscriber identification token for providing local authentication of a subscriber in a visited communication system, comprising:
  means for generating a plurality of keys in response to a received challenge, where at least one key from the plurality of keys is an integrity key that is provided to a communications unit communicatively coupled to the subscriber identification token and at least one key from the plurality of keys is an authentication key that is kept private from the communications unit;
  means for generating an authentication signal based on a received signal and the authentication key from the plurality of keys, wherein the received signal is transmitted from the communications unit communicatively coupled to the subscriber identification token, and the received signal is generated by the communications unit using the integrity key from the plurality of keys; and
  means for transmitting the authentication signal to the visited communication system via the communications unit, the authentication signal for authenticating the identity of the subscriber within the visited communication system.

18. A storage medium having one or more instructions operational on a subscriber identification token for providing local authentication of a subscriber in a visited communication system, which when executed by a processor causes the processor to:
  generate a plurality of keys in response to a received challenge, where at least one key from the plurality of keys is an integrity key that is provided to a communications unit communicatively coupled to the subscriber identification token and at least one key from the plurality of keys is an authentication key that is kept private from the communications unit;
  generate an authentication signal based on a received signal and the authentication key from the plurality of keys, wherein the received signal is transmitted from the communication unit communicatively coupled to the subscriber identification token, and the received signal is generated by the communications unit using the integrity key from the plurality of keys, and
  transmit the authentication signal to the visited communication system via the communications unit, the authentication signal for authenticating the identity of the subscriber within the visited communication system.

* * * * *

UNITED STATES PATENT AND TRADEMARK OFFICE
CERTIFICATE OF CORRECTION

PATENT NO. : 7,751,567 B2
APPLICATION NO. : 11/142994
DATED : July 6, 2010
INVENTOR(S) : Quick, Jr. et al.

Page 1 of 1

It is certified that error appears in the above-identified patent and that said Letters Patent is hereby corrected as shown below:

Column 11, line 55, claim 4: "the processor the configured to" to read as --the processor configured to--

Column 11, line 58, claim 4: "the mobile" to read as --the communication--

Signed and Sealed this
Twelfth Day of July, 2011

David J. Kappos
*Director of the United States Patent and Trademark Office*